June 25, 1968
D. R. FYFE
3,389,449
ROLLERS
Filed May 17, 1966
2 Sheets-Sheet 1
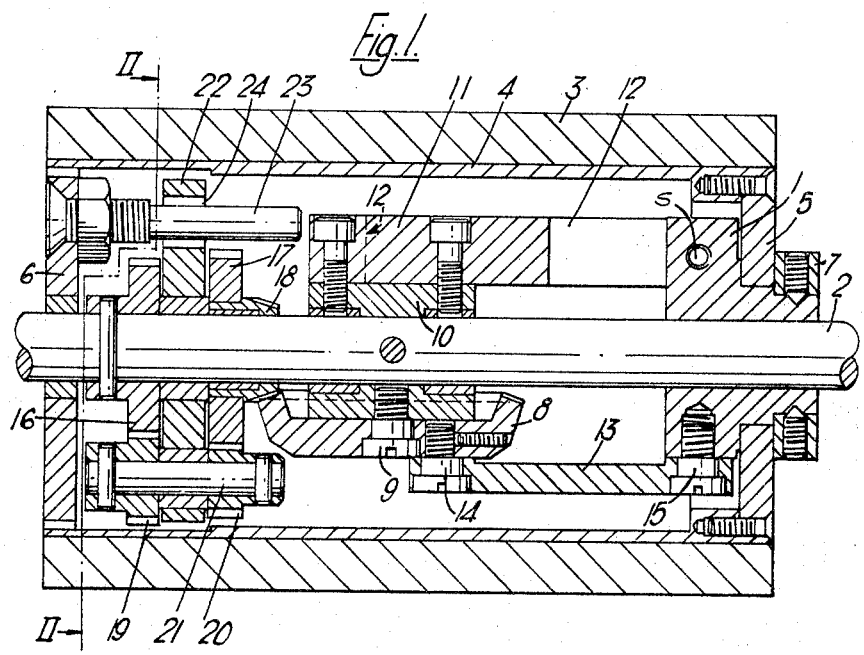
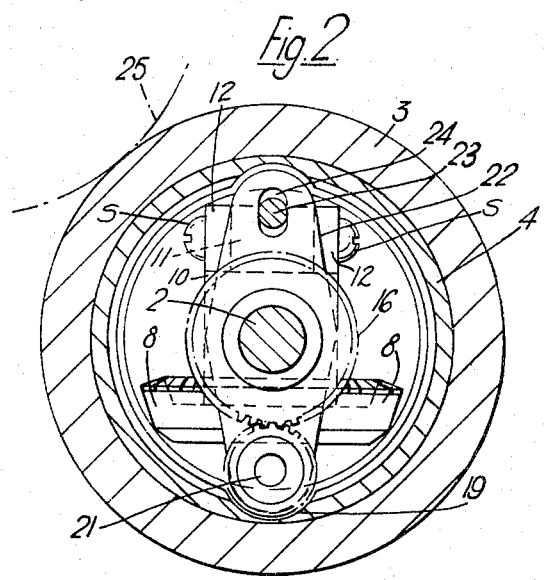
Inventor
Donald Ross Fyfe
By
Mason, Porter, Diller & Brown
Attorneys United States Patent Office 3,389,449
Patented June 25, 1968

3,389,449
ROLLERS
Donald Ross Fyfe, Middlesex, England, assignor to The Metal Box Company Limited, London, England, a British company
Filed May 17, 1966, Ser. No. 550,780
Claims priority, application Great Britain, June 2, 1965, 23,555/65
6 Claims. (Cl. 29—116)

ABSTRACT OF THE DISCLOSURE

Roller structure which is reciprocable axially while being rotated by frictional peripheral contact, the roller being hollow and surrounding a stationary shaft and rotatable about a bearing block which is slidable on the shaft but restrained against rotary movement with the roller, there being included a bevel gear housed within the hollow roller and supported for rotation about an axis at right angles to that of the shaft, a crank coupling the bevel gear with the bearing block to effect reciprocation of the block axially of the shaft, an epicyclic gear train mounted within the roller and meshing with the bevel gear to effect rotation thereof, and driving means housed within the roller for rotation therewith and coupling the roller with the epicyclic gear train to effect operation thereof on rotation of the roller.

Figure 3:
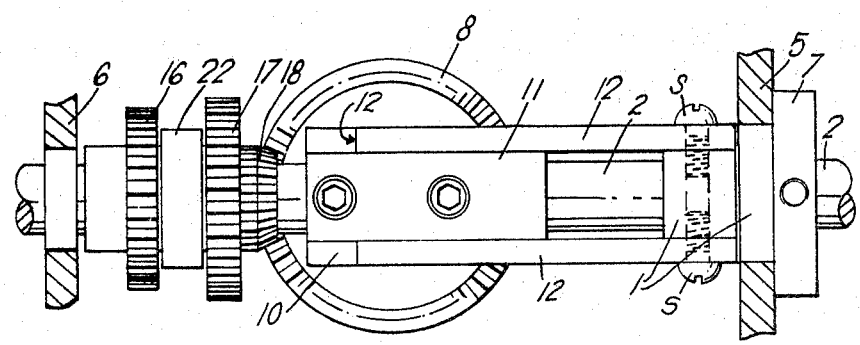

This invention relates to rollers and in particular to a roller which is reciprocable axially by frictional peripheral contact with a rotatable roller.

Rollers of the kind above mentioned are often used to effect the spreading of ink along a roller forming part of a printing apparatus and usually are driven by a variable speed mechanism external of the reciprocable roller. It has, however, been proposed to provide such rollers with an internal driving mechanism but with these proposals the ratio of rotation to reciprocation of the rollers has been of the order of 3:1. While this ratio is satisfactory at low speeds of the run of a printing machine, at higher speeds the reciprocating rollers tend to seize up.

It is a main object of the present invention to provide an axially reciprocable rotatable roller with an internal driving mechanism capable of operation with a ratio of rotation to reciprocation greater than that mentioned above.

According to the invention there is provided a hollow roller reciprocable axially by frictional peripheral contact with a rotatable roller, comprising a bearing block slidable axially of and constrained against rotation about a stationary shaft, a cylinder rotatable about said bearing block and movable axially therewith, a bevel gear housed in the cylinder and supported for rotation about an axis at right angles to that of the shaft, a crank coupling the bevel gear with said bearing block to effect reciprocation of the block axially of the shaft, an epicyclic gear train mounted in the cylinder and meshing with said bevel gear to effect rotation thereof, and driving means housed in the cylinder for rotation therewith and coupling the cylinder with the epicyclic gear train to effect operation thereof on rotation of the cylinder.

The epicyclic gear train may consist of a first gear secured to said shaft, a fourth gear rotatable about said shaft together with a bevel pinion meshing with said bevel gear, and second and third gears secured to a stub shaft parallel with said stationary shaft and supported for rotation about the stationary shaft, said second and third gears meshing respectively with said first and fourth gears. The stub shaft may be carried at one end of a bearing arm rotatable about the stationary shaft and the driving means consist of a pin parallel with the stationary shaft, said pin being carried by an end wall of the cylinder and being located in a slot formed in the opposite end of the bearing arm and having a length such as to accommodate the full extent of axial movement of the cylinder.

In order that the invention may be clearly understood one embodiment thereof will now be described, by way of example, with reference to the accompanying drawings, in which:

FIG. 1 is a longitudinal section through a roller according to the invention,
FIG. 2 is a section on line II—II, FIG. 1, and
FIG. 3 is a top plan of a part of FIG. 1.

Referring to the drawings, a bearing block 1 is slidable axially of a stationary shaft 2 and is constrained against rotation about the shaft as described below. A cylinder 3 carried by a hollow housing 4 having end walls 5, 6 is rotatable about the bearing block 1, being retained in position relative thereto by a collar 7 to be movable axially of shaft 2 with the bearing block 1. A bevel gear 8 is housed in the cylinder and is rotatable about a shoulder pin 9 screwed into a block 10 secured to the shaft 2. The axis of pin 9 is at right angles to that of the shaft 2. Also secured to the block 10 is a guide block 11, and retaining plates 12 co-operate with the guide block to constrain the bearing block 1 against rotation about shaft 2, said plates 12 being secured by screws S to said block, as clearly shown in FIGURES 1, 2 and 3.

A crank 13 couples the bevel gear 8 with the bearing block 1 to effect reciprocation of the block 1 axially of shaft 2, the crank 13 being connected to the bevel gear and bearing block by shoulder screws 14, 15. An epicyclic gear train is mounted in the cylinder and meshes with the bevel gear 8 to effect rotation thereof. The gear train consists of a first gear 16 secured to the shaft 2, a fourth gear 17 which is rotatable about the shaft 2, together with a bevel pinion 18 which meshes with the bevel gear 8, and second and third gears 19, 20 secured to a stub shaft 21 and meshing respectively with the first and fourth gears 16, 17. The stub shaft 21 is parallel with the stationary shaft 2 and is supported for rotation about shaft 2 by one end of a bearing arm 22 which is rotatable about shaft 2.

Driving means is housed in the cylinder and couples the cylinder with the epicyclic gear train to effect operation thereof. As shown in the drawings the driving means consists of a pin 23 which is parallel to the shaft 2 and is carried by the end wall 6. Pin 23 is located in a slot 24 formed in the end of arm 22 opposite the end thereof which carries the stub shaft 21 and the pin 23 has length such as to accommodate the full extent of axial movement of the cylinder.

By reference to FIGURE 1 of the drawing, it will be apparent that the slotted arm 22 is disposed between pairs of the epicyclic gear train gears, the first and second gears intermeshing at one side thereof, and the third and fourth gears intermeshing at the opposite side thereof.

In operation, the cylinder 3 is rotated about the axis of shaft 2 by frictional peripheral contact with a rotatable roller 25 shown by broken lines in FIG. 2. As the cylinder rotates, the pin 23 moving with the cylinder imparts movement to the bearing arm 22 about the axis of shaft 2 together with the second and third gears 19, 20 the latter of which rotates the fourth gear 17 and bevel pinion 18, thus effecting rotation of the bevel gear 8 and thereby causing the crank 13 to effect axial reciprocation of the cylinder through the bearing block 1. The length of pin 23 is such that it will not be withdrawn from slot 24 by reciprocation of the cylinder.

With the arrangement as shown in the drawings the ratio of cylinder rotation to reciprocation is 9:1 and the stroke is ¾ inch. It will, however, be understood that by altering the epicyclic gear ratios it is possible to alter the ratio of cylinder rotation to reciprocation and, according to the internal diameter of the housing 4, the ratio may be increased to about 45:1. It will also be understood that by increasing the throw of crank 13, also according to the internal diameter of the housing 4, it is possible to increase the stroke of reciprocation to about 1 inch.

It has been found that for efficient operation the peripheral speed of cylinder 3 should not exceed about one thousand feet per minute and if the roller is to be used to effect the spreading of ink on the surface of a roller the cylinder 3 should be made of non-corrosive metal to permit washing down thereof.

I claim:

1. The combination comprising a hollow roller reciprocable axially and rotated by frictional peripheral contact with a rotatable roller, a stationary shaft, a bearing block slidable axially of and constrained against rotation about the stationary shaft, a cylinder forming a part of the hollow roller rotatable about said bearing block and movable axially therewith, a bevel gear housed in the cylinder and supported for rotation about an axis at right angles to that of the shaft, a crank coupling the bevel gear with said bearing block to effect reciprocation of the block axially of the shaft, an epicyclic gear train mounted in the cylinder and meshing with said bevel gear to effect rotation thereof, and driving means housed in the cylinder for rotation therewith and coupling the cylinder with the epicyclic gear train to effect operation thereof on rotation of the cylinder.

2. A roller combination according to claim 1, wherein the epicyclic gear train consists of a first gear secured to said shaft, a fourth gear rotatable about said shaft together with a bevel pinion meshing with said bevel gear, and second and third gears secured to a stub shaft parallel with said stationary shaft, and supported for rotation about the stationary shaft, said second and third gears meshing respectively with said first and fourth gears.

3. A roller combination according to claim 2, wherein the stub shaft is carried at one end of a bearing arm rotatable about the stationary shaft and the driving means consists of a pin parallel with the stationary shaft, said pin being carried by an end wall of the cylinder and being located in a slot formed in the opposite end of the bearing arm and having a length such as to accommodate the full extent of axial movement of the cylinder.

4. A roller combination according to claim 2, wherein the stub shaft is carried at one end of a bearing arm rotatable about the stationary shaft and the driving means consists of a pin parallel with the stationary shaft, said pin being carried by an end wall of the cylinder and being located in a slot formed in the opposite end of the bearing arm and having a length such as to accommodate the full extent of axial movement of the cylinder, said first, second, third and fourth gears comprising spur gears, and said slotted bearing arm being disposed between pairs of said epicyclic gear train gears the first and second gears intermeshing at one side thereof and the third and fourth gears intermeshing at the opposite side thereof.

5. A roller combination according to claim 1, wherein the driving means includes a bearing arm rotatable about the stationary shaft and connected with the epicyclic gear train and a pin parallel with the stationary shaft, said pin being carried by an end wall of the cylinder and projecting into and through a slot formed in the bearing arm and having a length such as to accommodate the full extent of axial movement of the cylinder.

6. A roller combination according to claim 1, wherein the epicyclic gear train consists of a first gear secured to said shaft, a fourth gear rotatable about said shaft together with a bevel pinion meshing with said bevel gear, and second and third gears secured to a stub shaft parallel with said stationary shaft, and supported for rotation about the stationary shaft, said second and third gears meshing respectively with said first and fourth gears, said first, second, third and fourth gears comprising spur gears.

References Cited
UNITED STATES PATENTS

| | | | |
|---|---|---|---|
| 378,344 | 2/1888 | Thomson | 74—22 |
| 897,152 | 8/1908 | Rockstroh | 101—348 |

BILLY J. WILHITE, *Primary Examiner.*